(No Model.)  
2 Sheets—Sheet 1.
J. A. YINGLING.
VALVE FOR STEAM PUMPS.
No. 305,034. Patented Sept. 9, 1884.
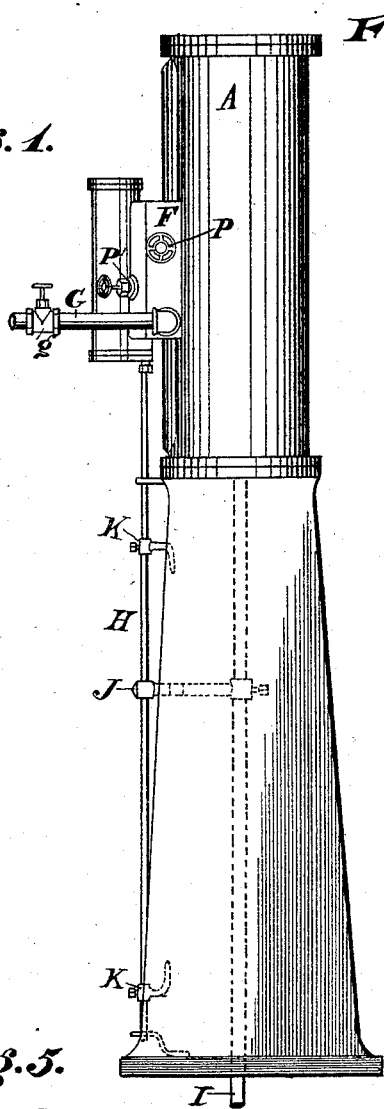
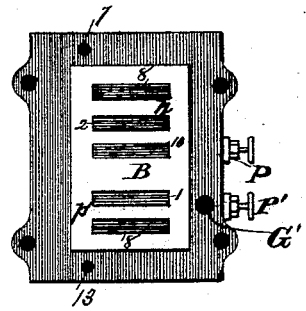
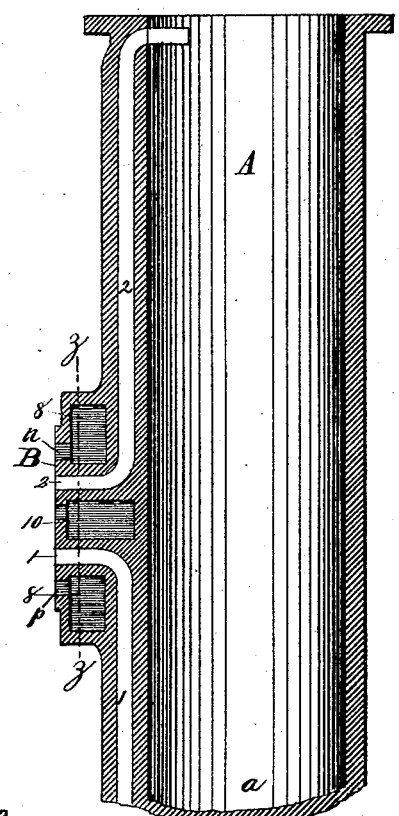
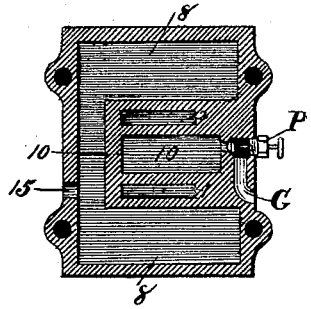
Attest  
Jos. H. Sims  
A. Huchowsky
Inventor  
Joseph A. Yingling  
by Wood & Boyd  
his Attorneys &c.

(No Model.)
J. A. YINGLING.
VALVE FOR STEAM PUMPS.
No. 305,034.    Patented Sept. 9, 1884.
2 Sheets—Sheet 2.
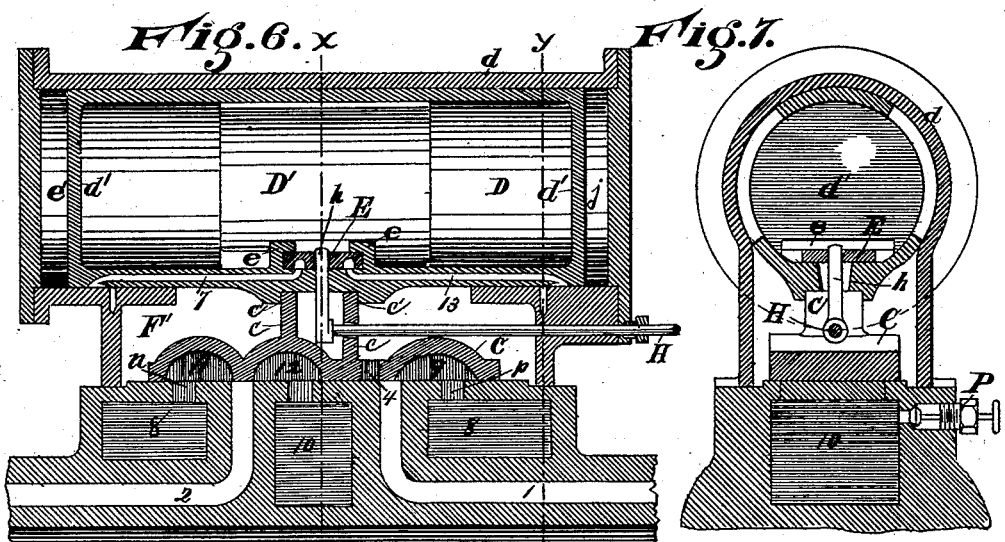
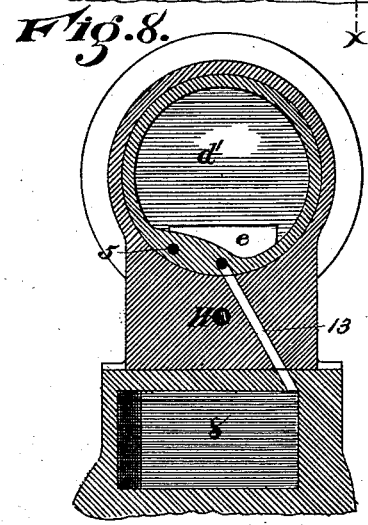
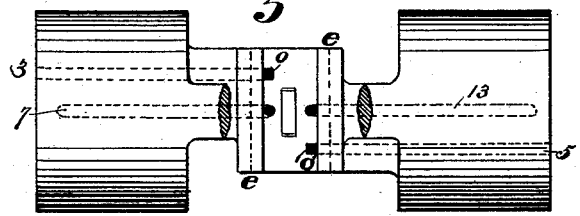
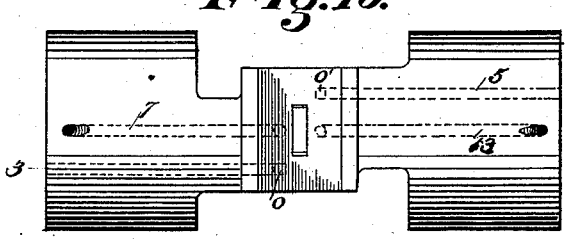
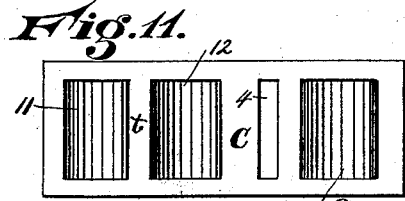
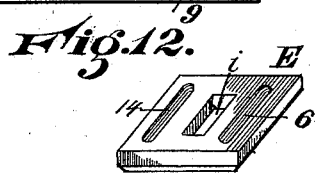
Attest
Jos. H. Sims
A. Gluchowsky
Inventor
Joseph A. Yingling
by Wood & Boyd
his Attorneys &c

UNITED STATES PATENT OFFICE.

JOSEPH A. YINGLING, OF CINCINNATI, OHIO.

VALVE FOR STEAM-PUMPS.

SPECIFICATION forming part of Letters Patent No. 305,034, dated September 9, 1884.

Application filed April 14, 1884. (No model.)

*To all whom it may concern:*

Be it known that I, JOSEPH A. YINGLING, a citizen of the United States, and a resident of Cincinnati, in the county of Hamilton and State of Ohio, have invented certain new and useful Improvements in Valves for Steam-Pumps, of which the following is a specification.

My invention relates to an improved valve which is especially adapted for steam-pumps.

The object of my invention is to provide a positive valve movement which can be regulated to any desired slowness of speed.

The second object is to so combine the valve with the cylinder-pistons and throttle-valves that the pressure may be regulated upon either end of the piston at will.

Another object of my invention is to provide suitable means for operating the valves by means of the piston and slide-valve rods.

My improvement may also be used with hoisting-machines or other similar apparatus, and operated in a similar manner as herein shown.

Figure 1 is a side elevation of my improvement. Fig. 2 is a top plan view of the valve-seat. Fig. 3 is a central longitudinal section of the cylinder and steam-ports. Fig. 4 is a cross-section on line $z\,z$, Fig. 2. Fig. 5 is a cross-section of the valve-rod and tripping devices. Fig. 6 is an enlarged central longitudinal vertical section of the valve and ports. Fig. 7 is a cross-section on line $x\,x$, Fig. 6. Fig. 8 is a cross-section on line $y\,y$, Fig. 6. Fig. 9 is a top plan view of the piston-valve. Fig. 10 is a bottom plan view of the same. Fig. 11 is a bottom plan view of the slide-valve. Fig. 12 is a bottom perspective view of the auxiliary valve.

A represents the ordinary steam-cylinder.

B represents the valve-seat, and C the slide-valve. It is provided with ears or stems $c$, which engage with shoulders $c'$ on the under side of the piston-valve D.

$d$ represents the cylinder of the piston-valve D.

$d'\,d'$ represent the piston-heads.

E represents an auxiliary valve working upon a seat formed on a section which connects the piston-valve heads $d'\,d'$ rigidly together.

$e\,e$ represent ways in which the valve E moves.

F represents the steam-chest.

1 represents a passage leading from one of the slide-valve ports to the lower end of the cylinder, for lifting the piston-rod.

2 represents a steam-passage leading from another port in the slide-valve to the opposite end of the cylinder, for moving the piston in the opposite direction.

G represents the steam-feed pipe for introducing steam into chest F'.

$g$ represents a stop-valve.

H represents the valve-rod, which is suitably journaled on a line with the slide-valve C, as shown in Fig. 6. The slide-valve C is provided with one port, 4, and three recesses, 9 11 12, port 4 communicating with steam-passage 1 and steam-chest F', recess 9 communicating with the exhaust-chamber 8 in the steam-chest through the port $p$, and recess 11 communicating with the exhaust-chamber and passage 2 through the port $n$, so that the exhaust may pass alternately from passages 1 and 2 through the recesses 9 and 11 in the slide-valve into the exhaust-chamber 8.

P represents a throttle-valve tapping in the steam-passage between the live-steam chamber 10 and the supply G.

P' represents a steam-throttle valve for throttling the steam between the supply G and opening G', which leads from passage G into chest F', as shown in Fig. 2.

$h$ represents a crank-arm keyed upon the end of valve-rod H, and working in a slot, $i$, pierced in the auxiliary valve E for sliding the auxiliary valve as the crank-arm $h$ is oscillated. The auxiliary valve is operated by the valve-rod H to operate the piston-valve by the admission of steam alternately to either end of the piston-valve heads $d\,d'$.

$o$ represents a port leading from the steam-chamber D' through passage 3 into space $e'$.

$o'$ represents a steam-port, communicating from chamber D' through passage 5 to the opposite end of the piston-valve into space $j$. Steam is exhausted from space $e'$, through passage 3, port 6, and passage 7, into exhaust 8 in the steam-chest. Steam is exhausted from space $j$ through port $o'$, from passage 5 through port 14 into passage 13, thence into exhaust 8 in steam-chest. Passage 7 communicates from port 6 into exhaust 8 in the same manner as passage 13, which is shown in Fig. 8. Thus it will be seen that the steam operating the piston-valve is exhausted into the same space in the steam-chest as the exhaust from the main cylinder through the slide-valve. The piston-valve is supplied with live steam by steam-chests F' and D', which communicate with each other.

The mode of operation of my valve is as follows: The piston-valve D and slide-valve C are represented as being on centers. If, now, the auxiliary valve E is operated, steam will flow into the chamber D' between the piston d', whence it passes into the port o', Fig. 9, thence through the passage 3 into the space e', and moves the piston d' to the right, carrying with it slide-valve C, which is connected with the piston-stems c, opening passage 1, which communicates with port 4, which admits the steam to the lower end of the cylinder a, which moves the main piston in the direction of the arrow shown in Fig. 3.

I represents the piston-rod, on which is mounted a trip-arm, J, through which moves a valve-rod, H.

K K represent trips keyed upon the valve-rod H. As the trip-arm J comes in contact with the trip K, the face of which is inclined so as to act as a cam, the trip-arm J rotates the valve-rod H, and the crank-arm h moves the auxiliary valve E, covering the port o, and cutting off the admission of steam into the space e', and opens port o' for the admission of steam to the opposite end of the piston-valve into the space j through a port or steam-passage, 5, which causes the piston-valve D to move in the opposite direction. The steam in space e' will be exhausted through the ports or passages 3 into the port or passage 6 in valve E, thence through port or passage 7 into the exhaust-chamber of the main or slide valve. As the piston D is thus moved in an opposite direction, it carries with it the slide-valve C, which cuts off the supply-passage 1, opens the passage 2 for communicating with the opposite end of the steam-cylinder and piston, and exhausting from the opposite end of the cylinder back through the passage 1 into the recess 9 of the slide-valve, which communicates with the general exhaust 8. The passage 2 receives its live steam from the chamber 10 through port 12 and passage 2, (which is supplied with the live steam by pipe G, as shown in Fig. 4.) The two ends of the pistons exhaust each in the same manner through passages 1 and 2, except that passage 2 communicates with recess 11 in valve C for exhausting, and passage 1 connects with the port 9 in the valve C, port 12 communicating with the passage 10 in the steam-chest for admitting live steam.

I have shown my improvement as adapted to work on a vertical engine or piston; and in order to balance the piston against the pressure and load I provide a throttle-valve, P, which respectively communicates with the two passages leading from the live-steam chest 10 to the steam-chest F', so that the amount of steam admitted to either end of the piston-chambers may be controlled at will. Thus, when the engine is working vertically, and it is desired to lift a load which would be balanced by the weight of the piston and piston-rod, the steam is entirely cut off from the upper end of the piston-chamber as the weight balances the load, and as the load increases a corresponding amount the steam must be admitted into the upper chamber to do the work.

When it is desired to use the three valves for a horizontal engine, the recess 12 may be omitted, and a similar port, 4, may be employed to admit steam into passage 2.

This mode of constructing and operating the valve furnishes a positive balanced piston which may be run at a very low speed without any danger of stopping upon the centers, as well as adapted to be operated vertically against the weight of the pistons and piston-rods or operating machinery.

I claim—

1. In a steam-actuated valve for a steam-engine, the combination, with the slide-valve C, having port 4 and recesses 9 11 12, of the auxiliary valve E, actuated by an arm upon the extremity of an oscillating valve-rod, H, the piston D, and valve-seat B, all constructed substantially as described.

2. In a steam-actuated valve, the combination, with the valve D, of the slide-valve C, having a port, 4, and recesses 9 11 12, the auxiliary valve E, actuated by an oscillating valve-rod, H, and the valve-seat B, having steam-chamber 10, exhaust-chambers 8, and steamways 1 and 2, substantially as described.

3. In a steam-actuated valve, the combination, with the valve D, having a live-steam chamber, D', of the slide-valve C, having port 4 and recesses 9 11 12, and the auxiliary valve E, the steam and exhaust ports of the valve D communicating with the exhaust and live steam chambers D', substantially as described.

4. The slide-valve C, provided with the port 4 and recesses 9 11 12, in combination with the steam-chest having the exhaust-chamber 8, and the live-steam chamber 10, communicating with the supply-passage G, substantially as specified.

In testimony whereof I have hereunto set my hand.

JOSEPH A. YINGLING.

Witnesses:
EDWARD BOYD,
A. GLUKOWSKY.